United States Patent [19]

Bernstein et al.

[11] 3,910,906

[45] Oct. 7, 1975

[54] CHELOCARDIN DERIVATIVES

[75] Inventors: Edith Bernstein; Makoto Inaba; David Lyon Garmaise, all of Montreal, Canada

[73] Assignee: Abbott Laboratories, North Chicago, Ill.

[22] Filed: June 18, 1973

[21] Appl. No.: 371,104

[52] U.S. Cl.............. 260/247.5 R; 260/268 PC; 260/293.62; 260/307 C; 260/566 B; 424/248
[51] Int. Cl.$^2$........................................ C07D 295/22
[58] Field of Search... 260/268 PC, 247.5 R, 566 B, 260/293.62, 307 C

[56] References Cited
UNITED STATES PATENTS

| | | | |
|---|---|---|---|
| 3,150,151 | 9/1964 | Urbschat et al................ | 260/566 B |
| 3,164,585 | 1/1965 | Paquette ......................... | 260/566 B |
| 3,362,994 | 1/1968 | Scola............................... | 260/566 B |

OTHER PUBLICATIONS

R. L. Foltz et al., J.A.C.S. Vol. 92, pp. 6070–6071, (1970).

*Primary Examiner*—Donald G. Daus
*Assistant Examiner*—Jose Tovar
*Attorney, Agent, or Firm*—Paul D. Burgauer; Robert L. Niblack

[57] ABSTRACT

A number of specific hydrazone derivatives of chelocardin having high antibiotic activity are described. These new derivatives show unusually low toxicity and consequently, a very high therapeutic index as chemotherapeutic agents against gram-negative organisms.

3 Claims, No Drawings

CHELOCARDIN DERIVATIVES

DETAILED DESCRIPTION OF THE INVENTION

Chelocardin is the name assigned to the antibiotic M-319 originally described in U.S. 3,155,582 issued in 1964. The original publication did not disclose the chemical structure, but since then, the structure has been elucidated (see J.A.C.S., 92, page 6070 of 1970) and as a result of this knowledge, new derivatives were prepared. Unfortunately, predicting physiological activity of such new derivatives is impossible but, surprisingly, a new group of compounds has now been found that share and even exceed the chemotherapeutic activity of chelocardin itself while showing some advantageous physical and/or chemical properties.

The new compounds which are the subject of the present invention are the monohydrazone and (di)substituted monohydrazones of chelocardin, having the following general structure:

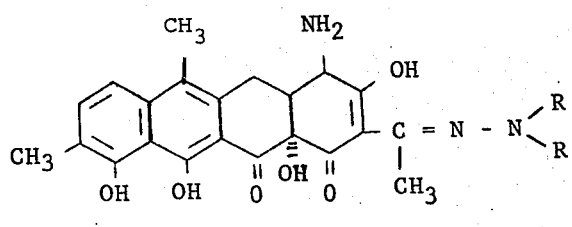

wherein each R represents hydrogen, loweralkyl, phenyl, or wherein one R is hydrogen, the other represents nitrophenyl, pyridyl, quinolyl, diloweralkylaminoloweralkyl and wherein both R together may represent a chain of the formula:

wherein $n$ and $m$ are 1 or 2 with the further proviso that the sum of $m$ and $n$ is 3 or 4, X stands for O, NH, N-loweralkyl, N-hydroxyloweralkyl or N-benzyl or a pharmaceutically acceptable acid addition salt thereof.

The new compounds can easily be prepared by reacting chelocardin with a slight excess of a molar equivalent of the desired compound of formula:

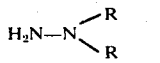

in an inert, organic solvent or an aqueous mixture therewith. The term "inert" used herein is meant to express that the material used does not react or interfere with any of the starting materials or the formed end product. Suitable reaction media are aqueous tetrahydrofuran (hereinafter simply referred to as THF), methanol, ethanol, acetic acid or mixtures thereof or aqueous mixtures thereof. Usually, it is preferred to react a suitable salt of chelocardin with the desired compound of formula II, e.g., the desired hydrazine or substituted hydrazine analogs.

In a preferred embodiment, a non-toxic acid addition salt of chelocardin or chelocardin itself is combined with the compound of formula II in an inert, organic solvent and the solution is allowed to stand at room temperature for a period between 30 minutes and 3 days. Reaction times beyond 24 hours usually add no further benefit and in may instances, the condensation is essentially complete in 1 – 2 hours. If desired, the temperature of the reaction medium may be raised but since room temperature ordinarily is adequate, no need exists to heat the mixture beyond 70° C. The preferred reaction solvents are THF alone or THF/water but methanol or ethanol alone or mixtures thereof with THF are equally suitable. If chelocardin base is the starting material, the condensation product of formula I is obtained; if the starting material is an acid addition salt, the final product is the corresponding acid addition salt of the compound of formula I. In either case, the base can easily be converted to the desired salt and the salt can be converted to the base in routine and known fashion.

In order to illustrate the manner of preparing the hydrazones of the present invention, reference is made to the following examples which, however, are not intended to limit the invention in any respect. In all instances, the thin-layer chromatograms and spectrographic data obtained were in agreement with the assigned structures. Since the newly introduced substituent is located in the 2a-position in all derivatives described below, this location is not specifically indicated in each example and only shown in formula I.

EXAMPLE 1

A solution of 1.37 g. of N-aminomorpholine in 12 ml. of water is added to 3 g. of chelocardin hydrochloride dissolved in 120 ml. of 97% aqueous THF. The clear solution is allowed to stand at room temperature for 1 hour. A gelatinous precipitate forms which is filtered, washed with water, methanol and ether. The solid product obtained (66% of theory) is converted to the hydrochloride by adding the theoretical amount of ethanolic hydrochloric acid to a suspension of the product in methanol, producing morpholinoimino-chelocardin hydrochloride.

EXAMPLE 2

A solution of 2.62 g. of 1-amino-4-methylpiperazine dihydrochloride in 100 ml. of methanol is added to chelocardin suspended in 200 ml. of methanol. After 2½ hours of stirring at room temperature, the reaction mixture turns into a clear solution as the chelocardin is completely converted to the hydrazone. Activated charcoal (2 grams) is added to the reaction mixture which is then stirred for 30 minutes and filtered. The filtrate is concentrated to a volume of 100 ml. and ether is slowly added until the solution turns slightly turbid. A crystalline product separates out upon standing. A second crop is precipitated from the filtrate by adding additional portions of ether. A total of 6.9 g. (98% of theory) of 4-methylpiperazinoimino-chelocardin dihydrochloride is obtained.

EXAMPLE 3

To a solution of 4 g. of chelocardin hydrochloride in 160 ml. of methanol and 10.4 ml. of dry hydrochloric acid in ethanol (0.88 N) is added 1.31 g. of 1-amino-4-(2-hydroxyethyl)piperazine. After 16 hours at room temperature, the reaction mixture is evaporated to dryness and the crude product is dissolved in 30 ml. of water. A light yellow solid separates in 50% yield, representing 2.2 g. of 4-(2-hydroxyethyl)piperazinoimino-chelocardin dihydrochloride. An additional crop of 2.3 g. of this material containing traces of a second spot by TLC is recovered from the filtrate by precipitation with ethanol/ether, producing a total of 4.5 g. (82% of theory) of the pure product.

EXAMPLE 4

To a suspension of 227 mg. of phenylhydrazine in 40 ml. of methanol is added 895 mg. of chelocardin hydrochloride and the mixture is stirred at room temperature. The solution turns clear in 10 minutes; stirring is continued for 1 hour and the solution is then concentrated to 20 ml. under reduced pressure. Cooling in an ice bath and further concentration produces successive crops of chelocardin phenylhydrazone hydrochloride in a yield of 821 mg. (70% of theory); melting at 237° – 238° C. (dec.).

EXAMPLE 5

To a suspension of 400 mg. of 2,4-dinitrophenylhydrazine in 30 ml. of THF and 40 ml. of methanol is added 895 mg. of chelocardin hydrochloride. The mixture is stirred at room temperature for 2 hours. The clear solution is concentrated to 20 ml. and the resulting precipitate is filtered to yield 1.14 g. (90% of theory) of chelocardin 2,4-dinitrophenylhydrazone hydrochloride, melting at 230° – 233° C. (dec.).

EXAMPLE 6

Chelocardin hydrochloride (2.24 g.) and 2.62 g. of hydrazine dihydrochloride are dissolved in 185 ml. of methanol and 30 ml. of water. The solution is allowed to stand for three days. The residue obtained on evaporation is treated with ether and water, giving 2.1 g. of chelocardin hydrazone hydrochloride (90% of theory).

EXAMPLE 7

Chelocardin (1 g.) and 1.07 g. of 1-amino-4-benzyl-2,6-dimethylpiperazine are stirred at room temperature in 20 ml. of acetic acid for 72 hours. The insoluble residues are filtered off and, after removing the acetic acid, the residue is taken up in 100 ml. of ether. The product separates as a yellow, amorphous material identified as 4-benzyl-2,6-dimethylpiperazinoiminochelocardin in a yield of 547 mg.. For evaluation, the free base is converted to the hydrochloride and purified by gel filtration chromatography.

EXAMPLE 8

To a suspension of 1 g. of chelocardin in 60 ml. of methanol is added 450 mg. of N,N-dimethylaminoethyl hydrazine dihydrochloride. The reaction mixture is stirred for 16 hours at room temperature in a nitrogen atmosphere. After evaporation of the methanol, the product is subjected to fractional precipitation, using methanol/ethanol/ether. The purest fraction is obtained in a yield of 12% of theory, representing dimethylaminoethylhydrazone chelocardin dihydrochloride.

EXAMPLE 9

To a solution of 447 mg. of chelocardin hydrochloride and 204 mg. of 3-amino-2-oxazolidone in 20 ml. of methanol is added 0.5 ml. of 4 N hydrochloric acid and the solution is left standing at room temperature for 18 hours. The crystals produced are filtered; they represent a yield of 532 mg. (100%) of 2-oxazolidono-3-imino-chelocardin hydrochloride melting at 265° – 275° C.

EXAMPLE 10

A solution is prepared of 447 mg. of chelocardin hydrochloride and 464 mg. of 3-hydrazinoquinoline in 40 ml. of methanol. The solution is left at room temperature for 18 hours and the precipitated product is filtered, representing 210 mg. (35.6%) of chelocardin quinoline-3-hydrazone hydrochloride with a melting point above 270° C. (dec.).

EXAMPLE 11

A solution is prepared from 1.340 g. of chelocardin hydrochloride and 3.30 g. of N,N-diphenylhydrazine hydrochloride in 75 ml. of methanol. The solution is allowed to stand at room temperature for 2½ hours and subsequently is concentrated to 30 ml. To this solution is added dropwise 100 ml. of water to precipitate 1.71 g. of chelocardin N,N-diphenylhydrazone hydrochloride (93.0% of theory) melting at 167° – 175° C.

EXAMPLE 12

Chelocardin hydrochloride (1.962 g.) and 2.0 g. of N,N-dimethylhydrazine hydrochloride are dissolved in 200 ml. of methanol and 25 ml. of water is added. The mixture is stirred for 2½ days and subsequently filtered through a pad of 1 g. of activated charcoal. The filtrate is evaporated and the residue is recrystallized from methanol to yield 1.182 g. (50.9%) of chelocardin N,N-dimethylhydrazone dihydrochloride, melting at 240° – 245° C. (dec.).

EXAMPLE 13

To a solution of 2.225 g. of chelocardin hydrochloride in 100 ml. of methanol is added a suspension of 2.50 g. of 1-aminopiperidine in 130 ml. of methanol. To the mixture, 60 ml. of acetic acid and 2.0 ml. of 0.2 N hydrochloric acid is added and the heterogeneous mixture is stirred at room temperature for 20 hours. It is then filtered through a pad of 1 g. of activated charcoal and the filtrate is concentrated to a volume of 50 ml. The solids produced, 1.255 g., are filtered and redissolved in a mixture of 0.6 ml. of 4 N hydrochloric acid in 100 ml. of ethanol and treated with 0.2 g. of charcoal. The filtrate is concentrated to 15 ml. and poured into 200 ml. of ether. The solids are filtered and dried to produce 710 mg. (26.8%) of piperidinoiminochelocardin hydrochloride melting at 233° – 235° C. (dec.).

EXAMPLE 14

A solution prepared from 447 mg. of chelocardin hydrochloride and 218 mg. of 2-hydrazinopyridine in 35 ml. of methanol and 0.5 ml. of 4 N hydrochloric acid is allowed to stand at room temperature for 24 hours after which time an additional 0.5 ml. of 4 N hydrochloric acid is added. After standing at room temperature for 4 days, the mixture is concentrated to a small volume, producing 372 mg. of chelocardin-pyridine-2-hydrazone hydrochloride (69% of theory), melting at 225° – 235° C. (dec.).

EXAMPLE 15

In order to show the antibiotic and bacteriostatic activity of the compounds of the present invention, the minimum inhibitory concentrations (MIC) are demonstrated in Table I below. The bacteria are first grown in a brain-heart infusion broth for 24 hours at the optimum temperature for the organism. The culture is then diluted with water so that there are about 10 million viable organisms/ml. The cell suspension is used as the inoculum for the test reported below. The test compounds, about 20 mg. of each, are dissolved in 0.2 ml. of methanol and 19.8 ml. of water. The various test solutions of varying concentrations are well distributed in agar suspensions adjusted to a pH of 7.4 and placed in Petri dishes so that each dish contains a known amount of the test compound.

The surfaces of the solidified agar are then inoculated with the test culture by streaking the test culture on the surface of the plates with the standardized loop that has been dipped in the inoculum and incubated at room temperature for 24 hours. The MIC values in Table 1 are expressed in mcg./ml.

ceutical preparations and can be made easily, they are preferred.

For oral dosage forms, tablets, pills, wafers, suspensions, syrups, etc. can be prepared in standard fashion, using the usual pharmaceutically acceptable excipients such as carriers, diluents, pigments, dyes and coatings. The coatings for tablets may be of the kind that dissolves rapidly in the acidic environment of the stomach, or a sustained-release coating formulation may be selected to provide a gradual release of the active ingredient over an extended period of time in order to maintain a bacteriostatic blood level over periods ranging from 2–24 hours.

For the treatment of smaller animals, a daily oral dose of 10–200 mg./kg. is recommended. For larger animals, including humans, a daily oral dose of 50–800

TABLE 1

| Comp. of Ex. | Staph. Aureus 45 | Staph. Aureus Smith | S. Pyogenes C-203 | Enterococcus 89 | Escher. Coli Juhl | Kleb. Pneum. 8045 | Past. Mult. 10544 | Prot. Vulg. ABB JJ | Prot. Mira. Fin. 9 | Salm. Typhi. Ed. 9 |
|---|---|---|---|---|---|---|---|---|---|---|
| 1 | 12.5 | 12.5 | 12.5 | 12.5 | 25 | 6.2 | 0.78 | 6.2 | 12.5 | 3.1 |
| 2 | 6.2 | 6.2 | 3.1 | 12.5 | 6.2 | 3.1 | 0.78 | 6.2 | 6.2 | 3.1 |
| 3 | 12.5 | 6.2 | 3.1 | 6.2 | 6.2 | 1.56 | 0.39 | 3.1 | 3.1 | 1.56 |
| 4 | 6.2 | 6.2 | 6.2 | 12.5 | 50 | 12.5 | 0.78 | 50 | 50 | 25 |
| 5 | >100 | 100 | 50 | >100 | >100 | >100 | 12.5 | >100 | >100 | >100 |
| 6 | 25 | 25 | 25 | 50 | 100 | 50 | 6.2 | >100 | >100 | >100 |
| 7 | 25 | 25 | 25 | 25 | >100 | >100 | 12.5 | 100 | 100 | 100 |
| 8 | 50 | 50 | 50 | 100 | 50 | 25 | 3.1 | 25 | 25 | 25 |
| 9 | 25 | 25 | 25 | 25 | 25 | 25 | 1.6 | 6.2 | 12.5 | 25 |
| 10 | 50 | 50 | 25 | >100 | >100 | >100 | 100 | >100 | >100 | >100 |
| 11 | 50 | 50 | 25 | 100 | >100 | >100 | 25 | >100 | >100 | >100 |
| 12 | 12.5 | 12.5 | 6.2 | 6.2 | 12.5 | 6.2 | 0.78 | 6.2 | 6.2 | 3.1 |
| 13 | 50 | 25 | 25 | 50 | >100 | >100 | 50 | >100 | >100 | >100 |
| 14 | >100 | >100 | >100 | >100 | >100 | >100 | 25 | >100 | >100 | >100 |

As shown in Table 1, the compounds of the present invention exhibit valuable bacteriostatic properties and are consequently useful in pharmaceutical compositions. The compounds of this invention also exhibit very low oral and subcutaneous toxicities and produce essentially the same antibiotic activities in vivo as chelocardin. Thus, the compound of Examples 2, 3 and 5 show an oral $CD_{50}$ (CD = mean curative dose) of 25, 100 and 50 mg./kg., respectively, as determined by the mouse protection test. The same test shows subcutaneous $CD_{50}$ values of 25–100 mg./kg. for most of the compounds of the above test compounds.

In addition to the excellent bacteriostatic properties of the new compounds, they also show a surprising physical characteristic: they are more soluble in water than chelocardin, with some of the compounds showing very high solubility. In this respect, the new compounds distinguish favorably over chelocardin. This excellent solubility makes the new compounds particularly suitable for parenteral solutions which can easily be prepared by simply dissolving the new chelocardin derivatives in water which may be buffered to a pH of 7.0–7.8 and may contain 0.5–5% by weight of a preservative such as benzyl alcohol.

Preferably, the new derivatives are used in the form of their acid addition salts with pharmaceutically acceptable acids, i.e., hydrochloric, sulfuric, acetic, phosphoric, tartaric, citric, or succinic acid. Since hydrochloric acid forms stable acid addition salts with the new compounds and such salts are suitable for pharmamg. produces the desired antibiotic activity. Oral dosages are preferably prepared in unit dosage form with the dosage selected in such amounts that a single or several doses are administered over a 24 hour period.

What is claimed is:

1. A compound of the formula:

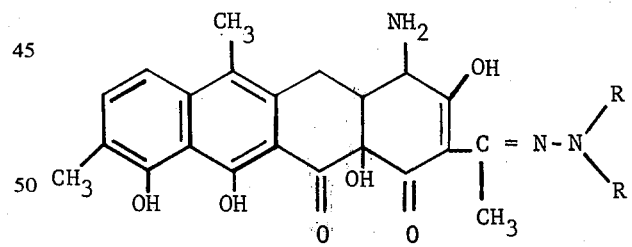

wherein both R substituents together with the nitrogen atom to which they are attached form morpholino, piperazino, 4-methyl-piperazino, 4-(2-hydroxy ethyl)-piperazino, 4-benzyl-2, 6-dimethyl-piperazino, piperidino; or a pharmaceutically acceptable acid addition salt thereof.

2. The compound of claim 1 wherein said R groups together form the morpholine ring.

3. The compound of claim 1 wherein said R groups form 4-(2-hydroxyethyl)-piperazino.

* * * * *